United States Patent [19]
McGraw et al.

[11] Patent Number: 5,825,864
[45] Date of Patent: Oct. 20, 1998

[54] PERSONAL AUTOMATIC REGISTRATION SYSTEM WITH CALL FORWARDING

[75] Inventors: Thomas F. McGraw, Fairfax; Jeffrey A. Mitulla, Burke, both of Va.; Richard S. Woll, Glen Burnie, Md.

[73] Assignee: Scientific and Commercial Systems Corporation, Alexandria, Va.

[21] Appl. No.: 888,364

[22] Filed: Jul. 3, 1997

Related U.S. Application Data

[63] Continuation of Ser. No. 354,827, Dec. 8, 1994, abandoned.

[51] Int. Cl.⁶ ........................................... H04Q 7/38
[52] U.S. Cl. ........................................... 379/210; 455/405
[58] Field of Search ................... 455/405, 38.3, 455/3.1, 557, 466, 422; 386/96; 370/346; 379/100.05, 34, 210

[56] References Cited

U.S. PATENT DOCUMENTS

| | | |
|---|---|---|
| 4,642,425 | 2/1987 | Guinn, Jr. et al. .................. 379/57 |
| 4,658,416 | 4/1987 | Tanaka ................................ 379/57 |
| 4,734,928 | 3/1988 | Weiner et al. ...................... 379/59 |
| 4,893,335 | 1/1990 | Fuller et al. ..................... 379/57 X |
| 5,153,902 | 10/1992 | Buhl et al. ........................ 379/57 |
| 5,164,985 | 11/1992 | Nysen et al. ....................... 380/9 |
| 5,197,092 | 3/1993 | Bamburak .......................... 379/59 |
| 5,315,636 | 5/1994 | Patel ................................ 379/58 |
| 5,325,419 | 6/1994 | Connolly et al. ................... 379/60 |
| 5,327,486 | 7/1994 | Wolff et al. ....................... 379/96 |
| 5,329,578 | 7/1994 | Brennan et al. .................... 379/67 |
| 5,353,331 | 10/1994 | Emery et al. ...................... 379/58 |
| 5,361,399 | 11/1994 | Linquist et al. ................. 455/56.1 |
| 5,497,412 | 3/1996 | Lannen et al. ................. 455/33.2 X |
| 5,548,637 | 8/1996 | Heller et al. ..................... 379/201 |
| 5,588,037 | 12/1996 | Fuller et al. ...................... 379/57 |

*Primary Examiner*—William Cumming
*Attorney, Agent, or Firm*—Collier, Shannon, Rill & Scott, PLLC

[57] ABSTRACT

The Personal Automatic Registration System (PARS) is a system of electronic circuits which have been designed to recognize a signal the presence or absence of a designated object or person within a specific area. The basic system consists of a transportable transmitter unit and one or more fixed base stations, or receivers.

62 Claims, 4 Drawing Sheets

PERSONAL AUTOMATIC REGISTRATION SYSTEM WITH CALL FORWARDING

This application is a continuation of application Ser. No. 08/354,827, filed Dec. 8, 1994, now abandoned.

BACKGROUND OF THE INVENTION

In many professions, the daily regimen of the individual includes extensive travel between home, office, and a number of off-site business locations. As a result, current telephone service is hard pressed to provide timely access to incoming telephone calls. Calls are manually directed to "last-known" numbers, and often lag the individual as he proceeds through a routine business day. The present invention decreases the lag time in connecting calls, via an automated system for rapid recognition and update of the system record of the individual's location. No conscious action is necessary on the part of the individual in order to benefit from what is sometimes called a "follow-me" service.

A primary application of this invention relates to the value of being able to directly route incoming telephone calls to an individual via one of several telephone instruments which are served by the automatic registration device. As individuals increasingly own and/or use several telephone instruments throughout the course of a routine day in their personal and professional lives, an advantage accrues to being able to contact that individual by sensing which instrument is most accessible to him at the time of the call. A single number would be assigned to the system user. The user's correspondents would not need to know three different numbers, for home, transportable, and work phones, and would not run the risk of charges for calls to "vacant" phones. Correspondent's knowledge of the system user's whereabouts, so critical today, becomes irrelevant. In this application, the present invention is expandable to cover families or offices with multiple cellular phones to permit direct contact with the single individual dialed.

PRIOR ART

U.S. Pat. No. 4,658,416 issued Apr. 14, 1987 to Tanaka is directed to an automatic call transfer system. The system automatically carries out transfer of a call by the use of an exchange which is coupled through subscriber lines to telephone sets. The telephone sets are specified by line numbers corresponding to the subscriber lines and are distributed in an area to be used by a person moving within that area.

U.S. Pat. No. 4,734,928 issued Mar. 29, 1988 to Weiner et al. is directed to a device for multiplying the quantity of useable telephone numbers for one mobile telephone unit.

U.S. Pat. No. 5,197,092 issued Mar. 23, 1993 to Bamburak is directed to a location system for a personal communicator, such as a cellular telephone, within a communications network. The system is based around a cellular telephone which the user carries with him to each location. Application specific devices, called "holsters" are located at each location to communicate with the cellular telephone.

U.S. Pat. No. 5,325,419 issued Jun. 28, 1994 to Connolley et al. is directed to a wireless digital personal communications system. It utilizes a plurality of portable handset terminals, radio cell base stations and a service control point.

U.S. Pat. No. 5,327,486 issued Jul. 5, 1994 to Wolff et al. is directed to a method and system for managing telephone calls. The system is designed to identify and screen incoming calls, present options to the user and either return a message to the caller or patch the call through depending on the user's decision.

U.S. Pat. No. 5,329,578 issued Jul. 12, 1992 to Brennan et al. is directed to a mobility and call management system. When the system receives an incoming call it looks to a user profile to determine the likely location of the subscriber, caller ID lists and various other access gateways. The system requires a database means for storing the required profile and instructional information.

U.S. Pat. No. 5,315,636 issued May 24, 1994 to Patel is directed to a personal telecommunications system. The system is designed around a series of base stations in continuous radio contact with a central service node. The base stations are located in such a manner as to receive a signal transmitted by a transmitter carried by the subscriber. The system will then direct a call to the phone at the subscriber's location or a pager if there is no system phone nearby.

U.S. Pat. No. 5,353,331 issued Oct. 4, 1994 to Emery et al. is directed to a personal communications service. The subscriber carries a handset which registers with a base station or a mobility controller.

U.S. Pat. No. 5,361,399 issued Nov. 1, 1994 to Linquist et al. is directed to a data communication system. It contains fixed location base stations and provides simulcast radio frequency channels over which to poll remote wireless components.

SUMMARY OF THE INVENTION

The invention may be best summarized in the form of one of its principal applications; that of the "automatic registration" mechanism for a "one-number" telephone system. Description of this application or embodiment is meant to be illustrative only and should not in anyway be construed to limit the invention thereto. In this application, "automatic registration" means the automatic update of dial-up information stored in a centralized intelligent switch system. Update is accomplished each time the transmitter enters or leaves the monitored proximity of the receiver unit. Entry or departure results in an automatic call to the switch, passing the identity of the telephone line serving the instrument where the receiver is located. The intelligent switch uses this update to command its call-forwarding operations, so that calls will literally follow a user, in order, to each site where the transmitter has been detected and reported. This application of the invention addresses the problem of making direct, timely contact with an individual who changes location frequently during a given day.

Functionally, the invention employs a short-range transmitter with a discrete effective range, to identify proximity to selected wireline system phones. The system recognizes approach to the phone instrument in question, as well as departure from it. Each of these acts stimulates an automatically-dialed call to an extant central switch, wherein programmed and default logic selects the most likely and desirable destination for all single-number calls at the particular time at which they re-dialed. The transmitter subsystem of this invention is designed for small size and for extended battery life. In order to implement the desired small size, the design will utilize the maximum possible use of surface mount technology ("SMT"). To extend the battery life of the transmitter, the circuit contains a miniature electronic intervalometer, which limits the transmitter duty cycle to a few seconds of every five-minute time interval. The transmission burst includes at least two complete identification "words" in digital form during each cycle. Receipt and validation of a transmitter ID signal results in the holding of that ID and comparison of its repetitious transmission with an internal timer in the receive unit.

The receiver unit timing interval is longer than that of the transmitter, so the receiver can expect to receive one or more transmissions within each of its own intervals. If the receiver does not receive a valid update signal within two receiver intervals, it concludes that the transmitter has left the proximity area, and the receiver initiates a call to the central switch, which places all subsequent calls into a voice mail mode until the transmitter is detected by another receiver, or the user's cellular phone is turned on. Upon either of these events, the central switch then directs all calls to the new location, and maintains this situation until the unit again departs proximity of the receiver or until the cellular phone is turned off. This describes a complete cycle, which then repeats in response to individual movements.

OBJECTS OF THE INVENTION

Figure 1:
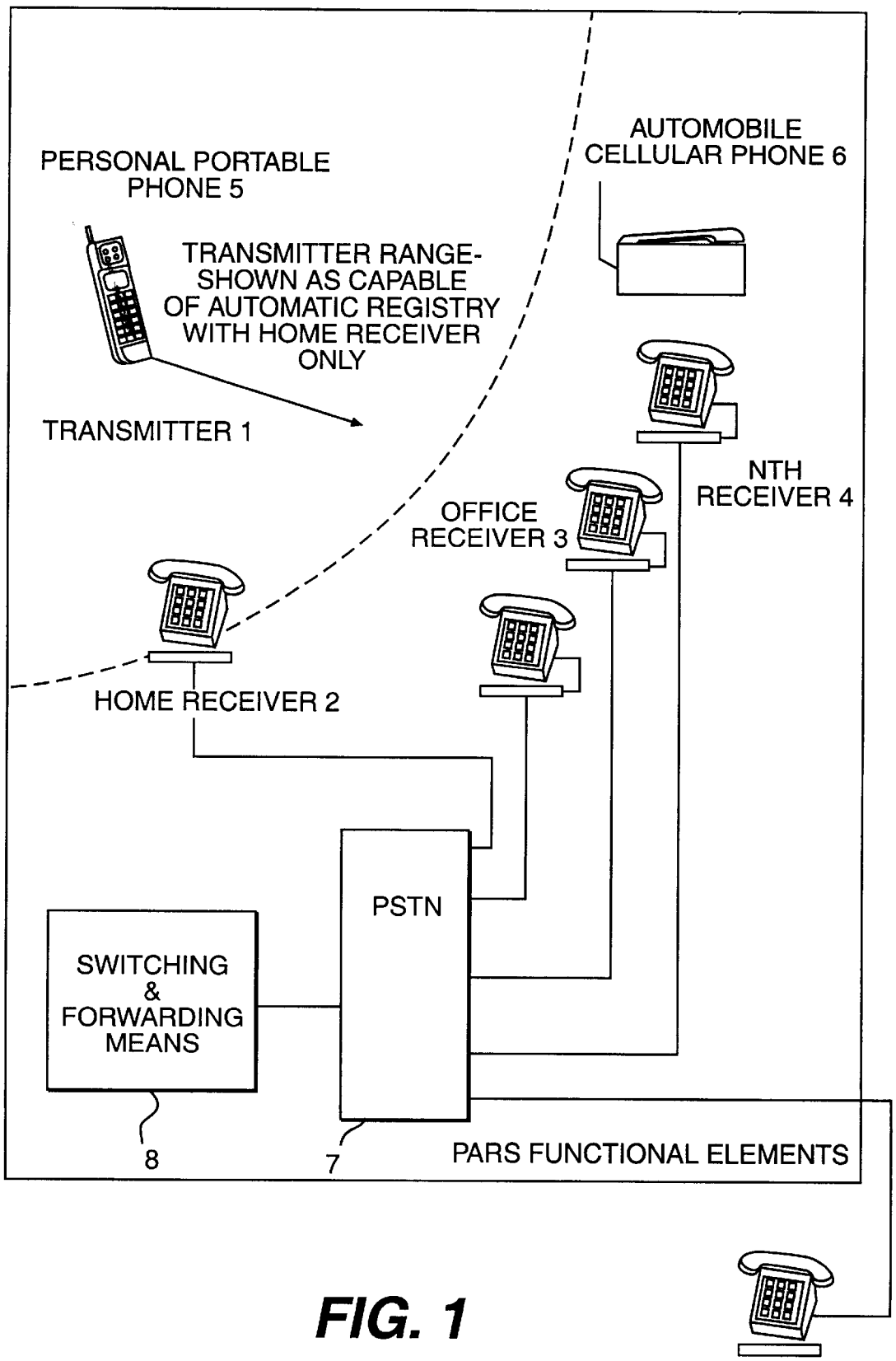
FIG. 1 is a graphical depiction of the relationship of the elements of one embodiment the present invention, as deployed in support of a "one-number" telephone system application.

It is an object of this invention to provide an automatic registration system which allows an individual to receive communications at several locations via one number.

It is another object of the invention to provide a system for the recognition and/or tracking of moving objects or people.

It is yet another object of the invention to provide a method for automatically receiving information in any one of a number of remote locations.

It is a further object of the invention to provide an intelligent network for the tracking and forwarding of telephone calls for an individual.

It is an additional object of the invention to provide a local security system in which the location of objects such as vehicles may be monitored.

It is an additional object of the invention to provide a local security system in which the location of people such as inmates or patients may be monitored.

DETAILED DESCRIPTION OF THE INVENTION

In operation, an unobtrusive miniature transmitter is attached to an object or carried by a person during normal activities. The transmitter periodically and automatically emits a short burst of energy, for example, radio frequency (RF) energy, bearing a specific digital or audio frequency identification (ID) code. Matching receivers are tuned to the same frequency, and are designed to compare the transmitted ID with their own, as stored internally. If a match is made, the principal reaction of the system is simply a relay closure. That closure is effectively a switch action, which can be applied to initiate any required response. The transmitter is designed to send a short ID burst on a programmable interval, in order to achieve the most effective duty cycle in terms of battery life. This burst includes two or more complete identification messages cycles, permitting the receiver to compare two consecutive ID transmissions for a high level of selectivity in the acceptance of a signal.

Subsequently, the logic of the receiver system compares the received ID code with that stored in its own internal memory. If the messages do not match the stored one, the system "concludes" that the message is not intended for it, and no action results. If however, the received ID code matches the one stored in the receiver, the logic causes a relay to close, initiating the desired action. The receiver "listens" for the desired ID code, either continuously or on a regular interval which is compatible with the transmitter interval. If the transmitted code is not heard within a selected time interval equal to at least more than one cycle of the transmitter, the receiver logic concludes that the transmitter has left the area, and releases the relay, initiating a different desired response, designed to notify the overall system that the transmitter is not within operating proximity of the receiver.

The first commercial application envisioned for this invention is in support of a personal calling service (PCS), as part of a single-number telephone service. In this application, for example, the function of the closing relay is to initiate an autodial device included in the receiver logic package, which calls a central switch to indicate that the subject telephone customer may now be reached at the number of the autodialer. Telephone company switch systems react by automatically routing all calls for that customer to that number. When the receiver recognizes that the transmitter is outside its effective range, the central switch is again called, now to request that the user's calls be switched to a voice mail system until the transmitter is detected by another receiver and the number is registered with the central switch.

Reference is now made to FIG. 1 of the drawings, which illustrates the functional elements of the Personal Automatic Registration System (PARS) as a telephone "follow-me" system. The transmitter unit 1 is shown attached to a convenient on a small "flip"-type cellular phone 5, although it may be attached to a convenient surface on any object that the using individual is likely to keep close by as a matter of habit. It could be on a briefcase, a key-ring fob, a notebook, or similar object. The home receiver 2 is shown beneath a standard touch-tone telephone, where it is likely to reside for convenience. The telephone, wall plug is connected directly into the receiver unit, which is subsequently plugged into the RJ-11 wireline wall socket. Depiction of the home receiver unit 2 within the range of the transmitter indicates that, in this illustration, the home receiver unit 2 would have recognized the proximity of the transmitter, and automatically dialed a predetermined number through the Public Switched Telephone Network (PSTN) 8 to the central switch, and registered the single-number to route all calls for this user to be received at the home location. Re-registration occurs anytime the range circle of the transmitter covers a new receiver unit, or uncovers an extant one.

Office receiver unit 3 through the nth receiver units 4 are physically identical, although each has a unit telephone number stored on-board, so that the central switch may recognize the destination of all registered calls. While automobile cellular phone 6 does not bear a transmitter or any other system element, it is important in that, if it is registered with the phone company to the user of the Personal Automatic Registration System, its activation can result in the central switching system direction of calls from the voice mail location to the automobile phone. When it is deactivated, calls are switched back to voice mail, to await either registration via PARS, or reactivation of an authorized cellular phone. Thus, a mobile phone may be easily integrated into the system.

Figure 2A:
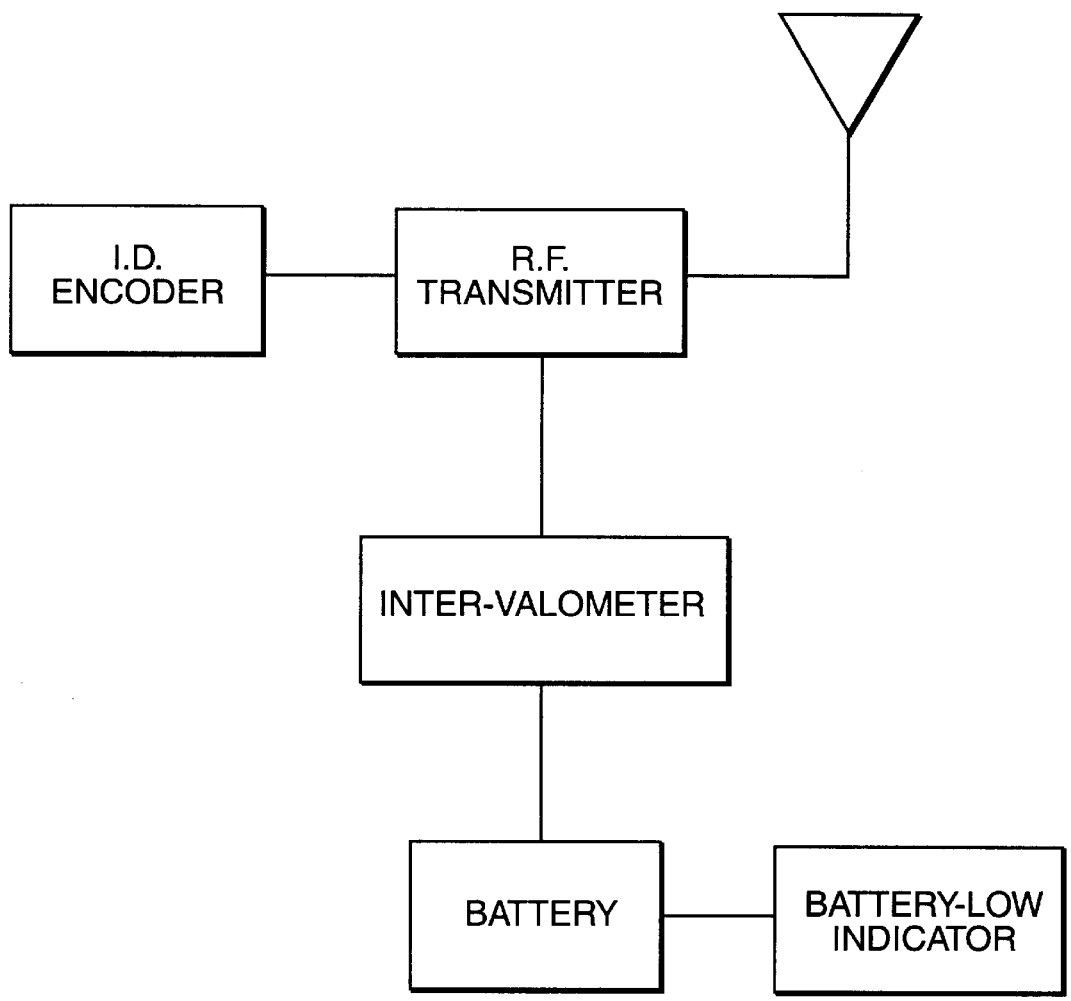
FIG. 2a is a block diagram, showing the functional elements of the transmitter unit subsystem.

FIG. 2A shows the simplified block diagram of the miniature transmitter sub-system. In practice, this unit is desirably smaller in volume than two cubic inches, and attached to its host with a grip-lick fabric or similarly temporary system. The transmitter will be either a single-chip device, or a one or two-transistor emitter, depending on size and cost considerations. The identification encoder is a single-chip device capable of accepting identity programming of one of a minimum 32,000 total available codes. The intervalometer circuit is a single-chip timer implemented to cause a duty cycle of approximately one second of transmission every five minutes, although this interval will be variable to accommodate other objectives. In practice, the intervalometer enables the encoder and the transmitter, so that either consumes battery power only during the small portion of the duty cycle. Therefore, the only power consumed for 299 out of every 300 seconds is that necessary to run the intervalometer or timer circuit.

Figure 2B:
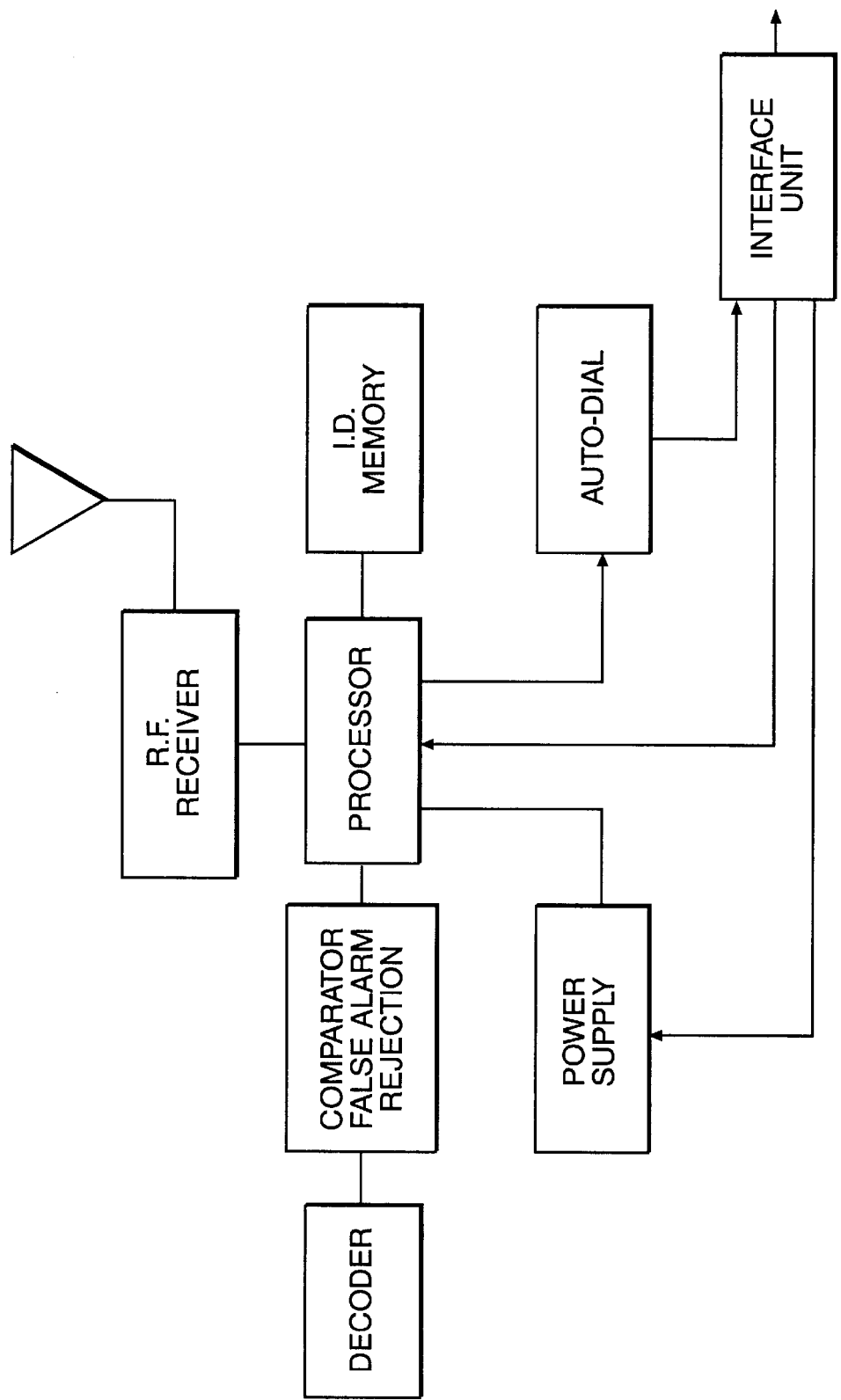
FIG. 2b is a block diagram, showing the functional elements of the receiver unit subsystem.

FIG. 2b shows the simplified block diagram of the base receiver unit. In practice, this unit has a footprint approximately the same as a desk-style telephone instrument, so that a phone may be set atop it for efficiency. The receiver will either be a single-chip unit or made of discrete components, based on economic considerations. The first receiver action is the decoding of any signals received by the unit. The decoder will respond only to the same ID code which is internally programmed, rejecting all others without action. A positive reaction from the decoder results in two or more code words being passed to the comparator circuit, where the words are compared, to ensure accuracy. If two consecutive words are not identical, the system will reject them as tainted by a transmission error. If the two words do accurately compare, the reception is passed with high confidence to the processor. The accepted word is then compared with the assigned system ID, which is held in memory. If the word matches, a command is sent to the autodialer, which is programmed with a number for the telephone company intelligent central switch. The autodialer also sends the identity of the sending telephone number so that the intelligent switch can either direct calls to that number or from it. The wireline phone interface provides proper impedance and provides the circuitry necessary to draw system power from the wireline phone system.

Figure 3:
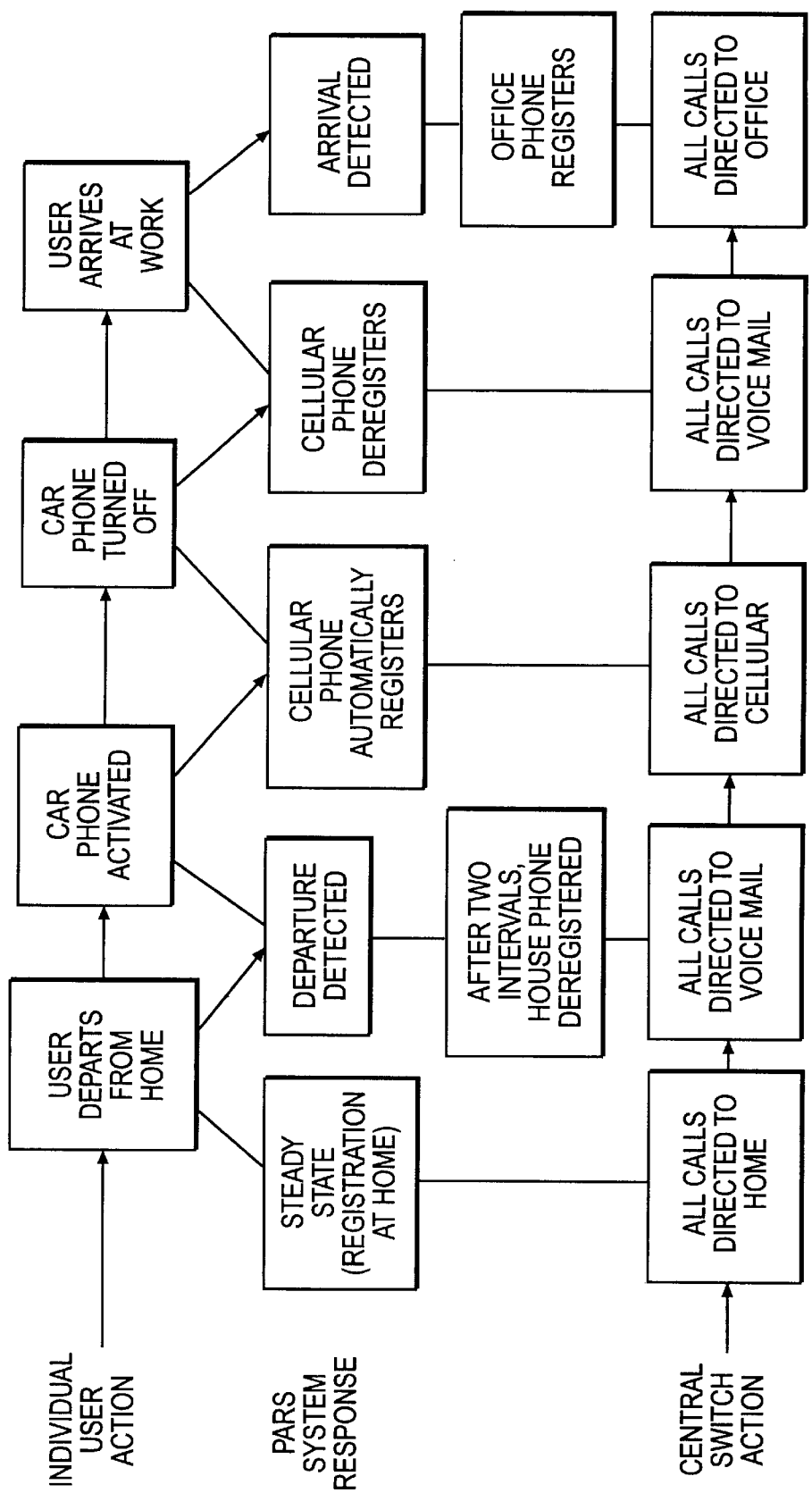
FIG. 3 is a functional diagram, showing the operating sequence of system events occurring in the "one-number" application.

FIG. 3 depicts the actual sequence of operations for a travel scenario from the home telephone environment through mobile access (flip phone or automobile cellular) to the office. All other operations are variants of this cycle. Beginning on the left, the steady state of the system is that the one-number telephone system is directing all calls to the home phone, since the transmitter is within the specified range (on the order of about 100 feet, for example) of the receiver unit, and the unit has registered the user at home. When the user leaves home in the morning, taking the transmitter with him/her, the receiver unit misses two transmissions from the transmitter and calls the intelligent switch to put calls into voice mail until the next registration occurs. In this scenario, the next registration occurs when the transmitter is carried into proximity of the office receiver unit. The office receiver unit recognizes the occurrence and registers the system to its own number, so all calls now are directed to the office until the user leaves and deregistration occurs. All operations may be found in this simplified scenario.

It is contemplated that the receiver units may be equipped with a manual override switch to allow for a user to wander technically "out of range" of a receiver without initiating the autodialing sequence. This would be desirable, for example, in a situation where the user had a receiver in a large facility such as a factory, and wanted calls to be directed to that location all day—even if the user were to wander out of range from time to time.

It will be apparent to those skilled in the art the various modifications and variations can be made in the construction and configuration of the present invention without departing from the scope and spirit of the invention. Specifically, while the example in the specification was directed to telecommunications, it is well within the scope of the invention to transmit, data or video information on the system of this invention.

We claim:

1. A system to facilitate, through use of a land line public switched telephone network (PSTN), communication with an individual through automatic registration of an associated object which moves with said individual, said system comprising:

a. the object comprising one-way transmitter means for generating an identification signal, wherein the transmitter means continually transmits said identification signal at periodic intervals;

b. a plurality of controllable receiver means for receiving said identification signal, said receiver means being physically independent of said transmitter means, wherein said receiver means is capable of receiving an identification signal from a plurality of said transmitter means;

c. switching and forwarding means further comprising means for cooperating with the PSTN through a PSTN connection to forward the communication to any location accessible through the PSTN having associated therewith one of said plurality of controllable receiver means; and d. communication means independent of said one-way transmitter means and cooperating with said receiver means for communicating in a wireline mode with any location within the PSTN;

wherein said receiver means cooperates with said communication means and said switching and forwarding means through the PSTN connection.

2. The system of claim 1 wherein each of the receiver means comprises a radio frequency receiver, a decoder, an identity comparison means, a central processor, a power supply, an identity memory, an automatic dialer, and telecommunication interface circuitry.

3. The system of claim 1 wherein each of said receiver means is in communication with a telecommunication means.

4. The system of claim 1 wherein said transmitter means is a short range radio frequency transmitter.

5. The system of claim 1 wherein said transmitter means transmits an encoded signal to be decoded only by receivers with the subscriber's unique code stored in said receiver's memory.

6. The system of claim 5 wherein said signal is transmitted at a specific time interval which is determined by an intervalometer circuit contained in said transmitter means.

7. The system of claim 1 wherein said switching means is a programmed default logic switching means.

8. The system of claim 1 where said communication means is a telephone.

9. The system of claim 1 where said communication means is a computer.

10. A system to facilitate, through use of a land line public switched telephone network (PSTN), communication with a plurality of individuals through automatic registration of a plurality of objects, each object associated with one of said individuals and which moves with the associated individual, said system comprising:

a. each object comprising one-way transmitter means for generating a unique identification signal, wherein each transmitter means continually transmits, at periodic intervals, said unique identification signal;

b. controllable receiver means for receiving said identification signals, wherein said receiver means is capable of receiving an identification signal from a plurality of said transmitter means;

c. switching and forwarding means further comprising means for cooperating with the PSTN through a PSTN connection to forward the communication to any location accessible through the PSTN having associated therewith one of said plurality of controllable receiver means; and d. communication means independent of said one-way transmitter means and cooperating with said receiver means for communicating in a wireline mode with any location within the PSTN;

wherein said receiver means cooperates with said communication means and said switching and forwarding means through the PSTN connection.

11. The system of claim 10 wherein said transmitter means is a short range radio frequency transmitter.

12. The system of claim 10 wherein each of said receiver means is in communication with a telecommunication means.

13. The system of claim 10 wherein said transmitter means transmits an encoded signal to be decoded only by receivers with the individuals unique code stored in said receiver's memory.

14. The system of claim 13 wherein said signal is transmitted at a specific time interval which is determined by an intervalometer circuit contained in said transmitter means.

15. The system of claim 10 wherein said switching means is a programmed default logic switching means.

16. The system of claim 10 where said communication means is a telephone.

17. The system of claim 10 where said communication means is a computer.

18. A system to facilitate, through use of a land line public switched telephone network (PSTN), communication with an individual through automatic registration of an associated object which moves with said individual, comprising:

a. the object comprising one-way transmitter means for generating a unique identification signal, wherein the transmitter means continually transmits, at periodic intervals, said identification signal;

b. a plurality of controllable receiver means for receiving said identification signal wherein said receiver means is capable of receiving an identification signal from a plurality of said transmitter means;

c. switching and forwarding means for registering automatically with the PSTN through a PSTN connection, the individual's location based upon movement of the object within predetermined proximity to any one of said controllable receiver means and to forward the communication to any location accessible through the PSTN having associated therewith one of said plurality of controllable receiver means; and d. a plurality of wireline communication means, each associated with one of said receiver means, physically independent of said one-way transmitter means, and each cooperating with its associated said receiver means for communicating in a wireline mode through the PSTN with any location accessible through the PSTN;

wherein said receiver means cooperates with said communication means and said switching and forwarding means through the PSTN connection.

19. The system of claim 18 wherein when the movement of said individual brings said transmitter means within predetermined proximity to one of said receiver means, said switching means routes communications for the individual to said communications means associated with that receiver means.

20. The system of claim 18 wherein when the movement of said individual brings said transmitter means out of predetermined proximity to one of said receiver means, said switching means routes communications for said individual to a default location.

21. The personal communication system of claim 18 wherein said transmitter has a limited range such that the transmitter can be in communication with only one receiver at any given time.

22. The system of claim 18 wherein each of the receivers comprises a radio frequency receiver, a decoder, an identity comparison means, a central processor, a power supply, an identity memory, an automatic dialer, and telecommunication interface circuitry.

23. The system of claim 18 wherein each of said receivers is in communication with a telecommunication means.

24. The system of claim 10 wherein said transmitter is a short range radio frequency transmitter.

25. The system of claim 10 wherein said transmitter transmits an encoded signal to be decoded only by receivers with the subscriber's unique code stored in said receiver's memory.

26. The system of claim 25 wherein said signal is transmitted at a specific time interval which is determined by an intervalometer circuit contained in said transmitter.

27. The system of claim 10 wherein said switch is a programmed default logic switch.

28. The system of claim 10 where said communicator is a telephone.

29. The system of claim 10 where said communicator is a computer.

30. The system of claim 1, wherein said controllable receiver means comprises an autodialer.

31. The system of claim 10, wherein said controllable receiver means comprises an autodialer.

32. The system of claim 18, wherein said controllable receiver means comprises an autodialer.

33. A system to facilitate through use of a land line public switched telephone network (PSTN), communication with an individual through automatic registration of an associated object which moves with the individual, said system comprising:

a. the object comprising one-way transmitter means for generating an identification signal, wherein the transmitter means continually transmits said identification signal at periodic intervals;

b. a plurality of controllable receiver means for receiving said identification signal, said controllable receiver means being physically independent of said transmitter means, wherein said receiver means is capable of receiving an identification signal from a plurality of said transmitter means;

c. switching and forwarding means further comprising means for cooperating with the PSTN through a PSTN connection to forward the communication to any location accessible through the PSTN having associated therewith one of said controllable receiver means; and d. communication means independent of said one-way transmitter means and cooperating with said receiver means for communicating in a wireline mode with any location within the PSTN, wherein said receiver means and said communication means cooperate with the PSTN through the same PSTN connection.

34. The system of claim 33, wherein each of said controllable receiver means comprises: a radio frequency receiver, a decoder, an identity comparison means, a central processor, a power supply, an identity memory, an automatic dialer, and telecommunication interface circuitry.

35. The system of claim 33, wherein each of said controllable receiver means is in communication with a telecommunication means.

36. The system of claim 33, wherein said transmitter means is a short range radio frequency transmitter.

37. The system of claim 33, wherein said transmitter means transmits an encoded signal to be decoded only by said receiver means with the individual's unique code stored in a memory of said controllable receiver means.

38. The system of claim 37, wherein the signal is transmitted at a specific time interval that is determined by an intervalometer circuit contained in said transmitter means.

39. The system of claim 33, wherein said switching means is a programmed default logic switching means.

40. The system of claim 33, wherein said communication means is a telephone.

41. The system of claim 33, wherein said communication means is a computer.

42. The system of claim 33, wherein said receiver means comprises an autodialer.

43. A system to facilitate, through use of a land line public switched telephone network (PSTN), communication with a plurality of individuals through automatic registration of a plurality of objects, each object associated with one of the individuals and which moves with the associated individual, said system comprising:
   a. each object comprising one-way transmitter means for generating a unique identification signal, wherein each transmitter means continually transmits, at periodic intervals, said unique identification signal;
   b. controllable receiver means for receiving said identification signals, wherein said receiver means is capable of receiving an identification signal from a plurality of said transmitter means;
   c. switching and forwarding means further comprising means for cooperating with the PSTN through a PSTN connection to forward the communication to any location accessible through the PSTN having associated therewith one of said controllable receiver means; and
   d. communication means independent of said one-way transmitter means and cooperating with said receiver means for communicating in a wireline mode with any location within the PSTN; wherein said receiver means and said communication means cooperate with the PSTN through the same PSTN connection.

44. The system of claim 43, wherein said transmitter means is a short range radio frequency transmitter.

45. The system of claim 43, wherein each of said controllable receiver means is in communication with a telecommunication means.

46. The system of claim 43, wherein said transmitter means transmits an encoded signal to be decoded only by said controllable receiver means with the individual's unique code stored in a memory said controllable receiver means.

47. The system of claim 46, wherein the signal is transmitted at a specific time interval that is determined by an intervalometer circuit contained in said transmitter means.

48. The system of claim 43, wherein said switching means is a programmed default logic switching means.

49. The system of claim 43, wherein said communication means is a telephone.

50. The system of claim 43, wherein said communication means is a computer.

51. The system of claim 43, wherein said receiver means comprises an autodialer.

52. A system to facilitate through use of a land line public switched telephone network (PSTN), communication with an individual through automatic registration of an associated object which moves with the individual, comprising:
   a. the object comprising one-way transmitter means for generating a unique identification signal, wherein the transmitter means continually transmits, at periodic intervals, said identification signal;
   b. a plurality of controllable receiver means for receiving said identification signal, wherein said receiver means is capable of receiving an identification signal from a plurality of said transmitter means;
   c. switching and forwarding means for registering automatically with the PSTN through a PSTN connection, the individual's location based upon movement of the object within predetermined proximity to any one of said receiver means and to forward the communication to any location accessible through the PSTN having associated therewith one of said controllable receiver means; and
   d. a plurality of wireline communication means, each associated with one of said receiver means, physically independent of said one-way transmitter means, and each cooperating with its associated said receiver means for communicating in a wireline mode through the land line network with any location accessible through the PSTN; wherein said receiver means cooperates with said switching and forwarding means through a PSTN connection.

53. The personal communication system of claim 52, wherein said transmitter means has a limited range such that said transmitter means can be in communication with only one receiver means at any given time.

54. The system of claim 52, wherein each of said controllable receiver means comprises a radio frequency receiver, a decoder, an identity comparison means, a central processor, a power supply an identity memory, an automatic dialer, and telecommunication interface circuitry.

55. The system of claim 52, wherein each of said controllable receiver means is in communication with a telecommunication means.

56. The system of claim 52, wherein said transmitter means is a short range radio frequency transmitter.

57. The system of claim 52, wherein said transmitter means transmits an encoded signal to be decoded only by said controllable receiver means with the individual's unique code stored in a memory of said controllable receiver means.

58. The system of claim 57, wherein the signal is transmitted at a specific time interval which is determined by an intervalometer circuit contained in said transmitter.

59. The system of claim 52, wherein said switching means is a programmed default logic switch.

60. The system of claim 52, wherein said communicating means is a telephone.

61. The system of claim 52, wherein said communicating means is a computer.

62. The system of claim 52, wherein said controllable receiver means comprises an autodialer.

* * * * *